(12) United States Patent
Takeuchi

(10) Patent No.: US 6,988,570 B2
(45) Date of Patent: Jan. 24, 2006

(54) DIRECTION CONTROL DEVICE OF CONTROL TARGET

(75) Inventor: Kesatoshi Takeuchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 86 days.

(21) Appl. No.: 10/126,961

(22) Filed: Apr. 22, 2002

(65) Prior Publication Data

US 2003/0010545 A1    Jan. 16, 2003

(30) Foreign Application Priority Data

Apr. 20, 2001   (JP) .......................................... 2001-123411
Apr. 20, 2001   (JP) .......................................... 2001-123412

(51) Int. Cl.
B62D 11/02    (2006.01)

(52) U.S. Cl. ........................ 180/6.48; 180/6.5; 318/432

(58) Field of Classification Search ................ 180/6.24, 180/6.5, 411, 6.26, 6.28, 6.48; 318/432–434, 318/437, 34, 41, 53, 66, 85, 489, 911
See application file for complete search history.

(56) References Cited

U.S. PATENT DOCUMENTS

| | | | | |
|---|---|---|---|---|
| 4,471,273 A | * | 9/1984 | Melocik et al. ................ 318/55 |
| 4,520,299 A | * | 5/1985 | Konrad ........................ 318/587 |
| 4,541,051 A | * | 9/1985 | Jarret et al. .................... 701/22 |
| 4,577,140 A | * | 3/1986 | Schmidt et al. ............. 318/587 |
| 4,774,518 A | * | 9/1988 | Fukuhara .................... 342/389 |
| 4,817,000 A | * | 3/1989 | Eberhardt ................... 701/200 |
| 4,825,132 A | * | 4/1989 | Gritter ......................... 318/811 |
| 4,900,992 A | * | 2/1990 | Sekizawa et al. ........... 318/135 |
| 5,222,568 A | * | 6/1993 | Higasa et al. .............. 180/65.5 |
| 5,258,912 A | * | 11/1993 | Ghoneim et al. ............. 701/42 |
| 5,345,155 A | * | 9/1994 | Masaki et al. .............. 318/138 |
| 5,379,223 A | * | 1/1995 | Asplund ........................ 701/4 |
| 5,456,332 A | * | 10/1995 | Borenstein ................... 180/167 |
| 5,469,928 A | * | 11/1995 | Adler et al. ................ 180/6.28 |
| 5,481,460 A | * | 1/1996 | Masaki et al. ................ 701/50 |
| 5,487,437 A | * | 1/1996 | Avitan ......................... 180/6.5 |
| 5,624,004 A | * | 4/1997 | Watanabe ................... 180/168 |
| 5,699,873 A | * | 12/1997 | Moriya et al. .............. 180/402 |
| 5,701,066 A | * | 12/1997 | Matsuura et al. ........... 318/808 |
| 5,921,338 A | * | 7/1999 | Edmondson ............... 180/65.5 |
| 5,973,463 A | * | 10/1999 | Okuda et al. ............... 318/430 |
| 6,192,304 B1 | * | 2/2001 | Goetz .......................... 701/41 |
| 6,353,408 B1 | * | 3/2002 | Whight .................. 342/357.02 |
| 6,360,163 B1 | * | 3/2002 | Cho et al. ................... 701/118 |
| 6,539,329 B2 | * | 3/2003 | Kato et al. .................. 702/151 |

FOREIGN PATENT DOCUMENTS

| | | |
|---|---|---|
| JP | 1-308106 | 12/1989 |
| JP | 2-262806 | 10/1990 |
| JP | 5-176418 | 7/1993 |
| JP | 5-328542 | 12/1993 |
| JP | 8-19110 | 1/1996 |
| JP | 2001-28804 | 1/2001 |
| JP | 2001-47887 | 2/2001 |

OTHER PUBLICATIONS

International Search Report, May 28, 2002.

* cited by examiner

*Primary Examiner*—Lesley D. Morris
*Assistant Examiner*—L. Lum
(74) *Attorney, Agent, or Firm*—Nixon Peabody LLP

(57) ABSTRACT

The left and right rear drive wheels of a vehicle are controlled independently, and the traveling direction of the vehicle is changed by providing a rotational speed difference between each of the left and right rear drive wheel. A vehicle operator merely designates the turning direction by moving an operation stick, e.g., to the left or right, which will in turn enable an automatic turn at an optimum curvature to be performed which frees the vehicle operator from complicated steering operations. A highly precise and responsive turn is achieved when the left and right independent control is implemented with a PLL control circuit.

15 Claims, 15 Drawing Sheets

DIRECTION CONTROL DEVICE OF CONTROL TARGET

BACKGROUND OF THE INVENTION

1. Field of the Invention

The present invention relates to a direction control device capable of altering the motion of the control target having a plurality of driving means by independently controlling the drive mechanism, and, for example, relates to a direction control device of an electric vehicle of a two-wheel drive and which is capable of changing directions based on the rotation difference of such drive wheels. As such drivers, for example, there are electric traveling vehicles such as an electric car, electric wheelchair, electric cart, and so on. The present invention may also be employed in electric construction machinery, electric welfare equipment, electric robots, electric toys, electric airplanes, and electric optical devices (camera, projector, etc.).

2. Background Art

In electric motor vehicles such as electric carts and electric cars, the vehicle speed is adjusted by controlling the rotational speed of the electric motor for driving the drive wheels. With current electric motor drive vehicles, when setting the speed, the accelerator pedal or throttle lever is operated, the acceleration is set based on the manipulated variable thereof, and, when the desired speed is reached, the accelerator pedal is returned to a prescribed level in order to maintain the speed.

Meanwhile, when steering the vehicle, it is standard that the passenger steers the steering wheel. Conventionally, when taking an electric cart or electric wheelchair as this type of electric vehicle, as the steering system thereof, there are those which change the traveling direction of the vehicle by steering the steering wheel or lever toward a prescribed direction to control the front wheels, and those which change the traveling direction of the vehicle by providing a rotation difference to the left and right rear wheels.

Nevertheless, with the front wheel steering type vehicles, a structure is required for steering the front wheels. Moreover, with the vehicles employing the steering method of providing a rotation difference to the left and right rear wheels, there is an inconvenience in that the passenger is required to provide a suitable rotation difference to the left and right rear wheels each time he/she wishes to change the direction of the vehicle.

SUMMARY OF THE INVENTION

An object of the present invention is to provide a direction control device which does not require a structure for steering the front wheels, which is capable of providing a rotation difference to the left and right drive wheels by the passenger merely changing the steering device such as a handle or lever in a desired direction, and, as a result, which enables the change in direction of the vehicle in a desired direction. Another object of the present invention is to provide control technology capable of quickly and accurately realizing the foregoing drive control of the left and right drive wheels. Still another object of the present invention is to provide a direction control device capable of applying a circular steering wheel as the steering device. A further object of the present invention is to provide, in an electric vehicle having front wheels as auxiliary wheels, control technology in which added to the foregoing direction control device is a control mechanism enabling the travel of an electric vehicle with such auxiliary wheels afloat while such electric vehicle is running. A still further object of the present invention is to provide an electric vehicle comprising the foregoing direction control device.

In order to achieve the foregoing objects, the present invention provides a direction control device capable of controlling the direction of a control target having a plurality of driving means by individually controlling the driving means, comprising: drive control means for controlling the drive of the respective drive means; target direction commanding means for commanding the target direction of the moving direction of the control target; and drive characteristic difference setting means for setting the drive characteristic difference to the respective driving means such that the direction of the control target is controlled in the target direction; wherein the drive control means controls the drive of each of the driving means in accordance with the drive characteristic difference.

Another direction control device according to the present invention further comprises drive characteristic difference detection means for detecting the drive characteristic difference of the respective driving means, wherein the drive control means comprises a control circuit for controlling the feedback of each of the driving means such that the drive characteristic difference detection result will become the drive characteristic difference set value.

The control circuit is a PLL control circuit which controls each of the driving means based on the phase difference of the reference signal frequency and the drive state detection signal frequency of the driving means.

The present invention also provides a direction control device having an electric motor for rotationally driving a plurality of drive wheels individually, and which is capable of controlling the vehicle direction by providing a rotation difference to the respective drive wheels based on the steering state of the steering means, comprising: drive control means capable of controlling the drive of each of the electric motors; target direction commanding means for commanding the target direction of the vehicle based on the steering state of the steering means; electric motor characteristic difference setting means for setting the rotational status of the respective electric motors providing the rotation difference in each of the drive wheels; and detection means for detecting the rotational status of the respective motors; wherein the drive control means controls the drive of the electric motor of each of the drive wheels in accordance with the set rotational status and detected rotational status of each of the electric motors, and is capable of controlling the advancing direction of the vehicle by providing a rotation difference to each of the drive wheels.

The drive control means comprises a PLL control circuit which controls the electric motor of each of the drive wheels based on the phase difference of the detected frequency signals pursuant to the reference frequency signal against the set rotational status to the electric motor of each of the drive wheels and the detected rotational status of the electric motor. The division value of the PLL circuit is altered with the drive mode of the vehicle.

The steering means is a steering wheel, and the target direction setting means sets the target direction of the vehicle in accordance with the steering state of the steering wheel. The vehicle comprises an auxiliary wheel which rotates in pursuit of the direction of the vehicle without any steerage or drive and supports the vehicle against the road surface; and the direction control device comprising floatation control means capable of floating the auxiliary wheel while the vehicle is running and maintaining and controlling the floating state of the auxiliary wheel against the road surface.

The present invention also provides a vehicle comprising the foregoing direction control device, and which comprises this direction control device as the moving direction control device as the control target.

The present invention also provides an electric vehicle comprising the direction control device having an electric motor for rotationally driving a plurality of drive wheels individually, and which is capable of controlling the vehicle direction by providing a rotation difference to the respective drive wheels based on the steering state of the steering means, comprising: drive control means capable of controlling the drive of each of the electric motors; target direction commanding means for commanding the target direction of the vehicle based on the steering state of the steering means; drive characteristics setting means for setting the drive state of the electric motor of each of the drive wheels for providing the rotation difference in each of the drive wheels such that the direction of the vehicle is controlled in the target direction; and detection means for detecting the rotational status of the respective motors; wherein the drive control means controls the drive of the electric motor of each of the drive wheels based on the rotational status set value of the respective motors and the rotational status detected value of the electric motor.

The drive control means comprises a PLL control circuit for controlling the electric motor of each of the drive wheels based on the phase difference between reference frequency signal pursuant to the set rotational status and the detected frequency signal pursuant to the detected rotational status of each of the electric motors.

The present invention also provides a steering control device of a vehicle having a plurality of wheels supporting the vehicle body against the road surface, comprising: drive control means capable of individually controlling the drive of each wheel of a pair of wheels provided to the left and right of the vehicle body among the plurality of wheels; steering angle setting means for setting the frequency signal corresponding to the steerage of the vehicle; drive signal output control means for outputting the drive signal of a prescribed frequency for performing drive control upon granting independence to each actuator of the wheels based on the angle signal designated with the steering angle setting means; steering angle detection means for detecting the angle of the current traveling direction with the direct advancing state of the vehicle as the reference; signal converting means for converting a signal to a frequency signal corresponding to the steering angle detected with the steering angle detection means; and phase comparison unit for comparing the phases of the frequency signal corresponding to the angle designated with the steering angle setting means and the frequency signal obtained with the signal converting means; wherein a drive signal is output to the drive mechanism of the respective wheels from the drive control means toward a direction in which the phases will coincide based on the comparison result of the phase comparison means.

The phase comparison means and drive control means comprise a PLL circuit. The respective drive mechanisms of the wheels are electric motors.

The PLL (Phase Locked Loop) circuit is a feedback control circuit for synchronizing the phases, and is used for controlling the output phase such that the signal having a frequency of a pulse or AC signal becomes the same phase as the reference signal. This technology is often used in spindle motors for rotating the hard disk of information processing equipment, motors for rotating the VCR heads, motors for rotating the polygon mirror for performing laser scans, and so on, and the target motor was in most cases a stepping motor or the like. With the present invention, the rotational speed of the motor can be controlled by performing inverter control even against AC motors and DC motors to be driven under a constant voltage, and, by further employing PLL technology, high-precision rotation angle control is enabled. Particularly, for example, in a case when the load against the movement of the driven plate alters, torque control becomes necessary. Nevertheless, by measuring the current speed of the driven plate, speed control is enabled in a state of adding the torque load.

The present invention also provides a vehicle direction control method capable of controlling the direction of a vehicle by controlling with a control circuit the rotational driving for rotationally driving a plurality of drive wheels independently and providing a rotation difference to the respective drive wheels in a rotational-drive state; wherein the control circuit includes: a step of comparing the phase difference between the reference frequency signal determined from the target drive state against each of the drive wheels and the detected frequency signal detecting the drive state of the drive wheels, and controlling the drive state of the rotational driving means based on this phase difference.

The present invention also provides a vehicle direction control method capable of controlling the direction of a vehicle by controlling with a control circuit the rotational driving for rotationally driving a plurality of drive wheels independently and providing a rotation difference to the respective drive wheels in a rotational-drive state; wherein the control circuit includes: a step of seeking the target drive state of each of the drive wheels based on the detection signal from the detection means for detecting the operational status of the passenger; and a step of comparing the phase difference between the reference frequency signal determined from the target drive state against each of the drive wheels and the detected frequency signal detecting the drive state of the drive wheels, and controlling the drive state of the rotational driving means based on this phase difference.

The control circuit includes the step of outputting a drive signal to the respective rotational driving means of each of the drive wheels based on the phase difference. The control circuit is structured by including a PLL.

In the present invention, the drive control means or control circuit for driving the rotational driving means such as an electric motor for performing drive control to the respective drive wheels is structured by including PLL as described above. Such drive control means or control circuit comprises a microcomputer, and performs feedback control so as to coincide or converge the drive state of the respective drive wheels with a desired drive state via the PLL circuit based on the processing results of the microcomputer.

DESCRIPTION OF THE PREFERRED EMBODIMENTS

Figure 1:
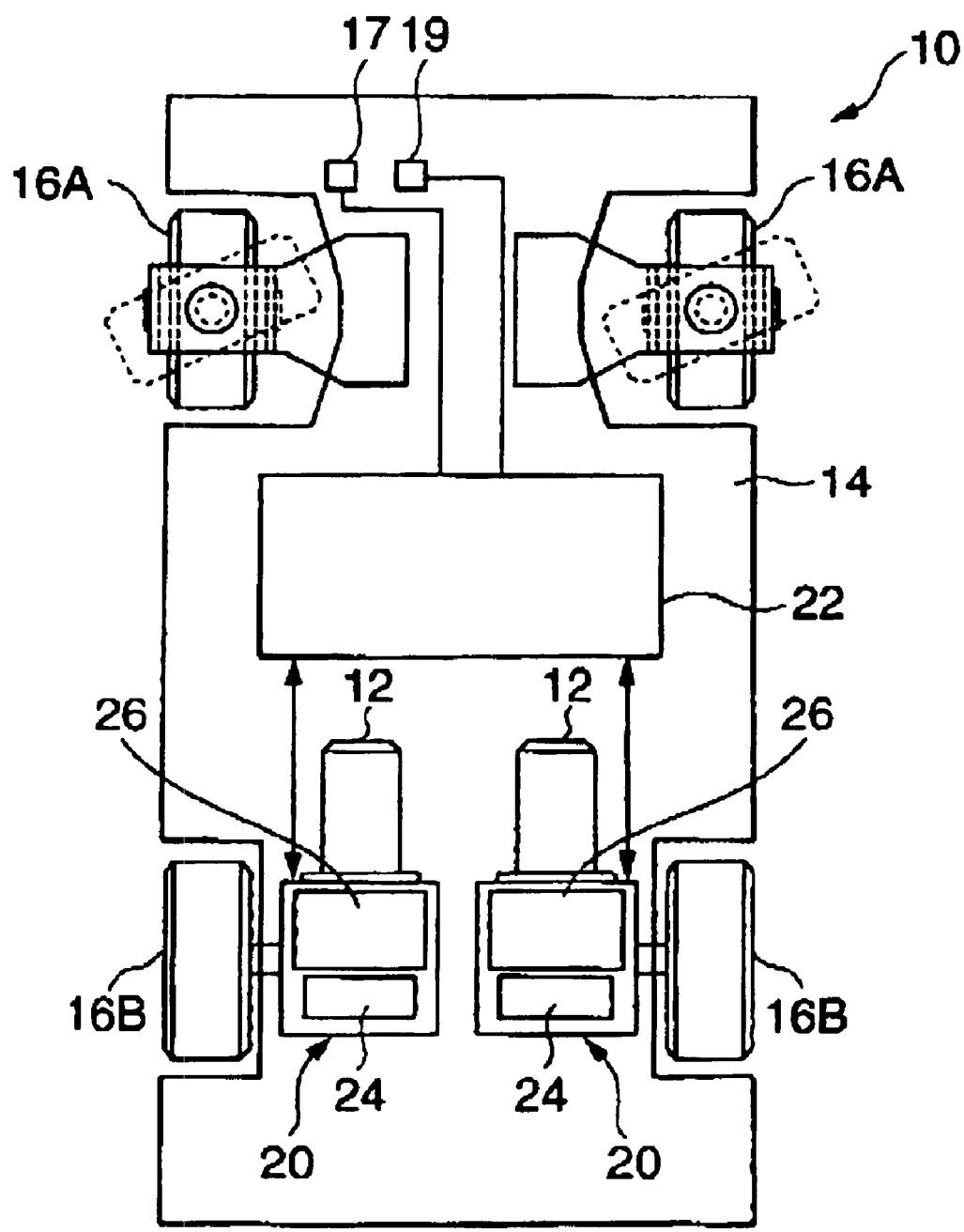
FIG. 1 is a structural diagram showing the vehicle to which the present invention is employed.

FIG. 1 shows the electric vehicle 10 comprising an example of the direction control device of the present invention. This vehicle 10 drives the respective left and right rear wheels 16B with an electric motor (pulse motor 12 described later). The vehicle body 14 is provided with two wheels in the front and back; that is, a total of four wheels. Reference numeral 16A shows the two front wheels and reference numeral 16B shows the two rear wheels. These four wheels 16 ground and support the vehicle 10 on the road surface.

The front wheels 16A are so-called cast type wheels in which the direction thereof freely changes in accordance with the traveling direction of the vehicle, and are non-drive wheels. These front wheels 16A are not steered with a steering device (steering wheel), and follow the moving direction and turning direction of the vehicle. The steering of the vehicle, as described later, is achieved by providing a rotation difference to the left and right rear wheels 16B, which are the drive wheels.

The front wheels support the front side of the vehicle, and, as described above, rotate in the front/rear/left/right directions in pursuit of the traveling direction of the vehicle. Moreover, even in cases where the left and right rear wheels mutually rotate in the opposite direction, the front wheels 16A become approximately transverse against the front/rear direction, and will not hinder the rotational movement of the vehicle 10. To the vicinity of these front wheels 16A, an angle encoder 17 and gyro sensor 19 for detecting the rotational angle of the vehicle are provided.

Each of the left and right rear wheels 16B is connected to a motor actuator 20. These motor actuators 20 are controllably connected to the speed/steering control unit 22. Each of the left and right motor actuators 20 rotate the drive wheels upon receiving a control signal from the speed/steering control unit 22. The rotational status such as the rotational speed of the drive wheels is thereby controlled. A rotation difference is provided to the respective drive wheels in a rotating state.

The motor actuator 20 is structured by comprising a pulse motor 12, which is an electric motor as the rotational driving means, a drive control unit 24 for controlling the drive of this pulse motor 12, and a transmission mechanism unit 26 for transmitting the driving force of the pulse motor 12 to the axle 16B. The drive control unit 24 drives the pulse motor 12 under a certain control characteristic and independently turns the left and right rear wheels 16B based on the designated control signal from the speed/steering control unit 22. Further, when the left and right rear wheels 16B are rotated at an identical revolution and rotational speed, the vehicle will either advance forward or move in reverse, and, when a revolution difference or rotational speed difference is provided to the left and right rear wheels, the vehicle will rotate or turn in the right direction or left direction in accordance with such difference. In addition, when the left and right rear wheels are rotated in the reverse direction, the vehicle will show a behavior of rotating on its axis. Thus, the passenger is able to steer the vehicle by providing a rotation difference to the left and right rear wheels.

Figure 2:
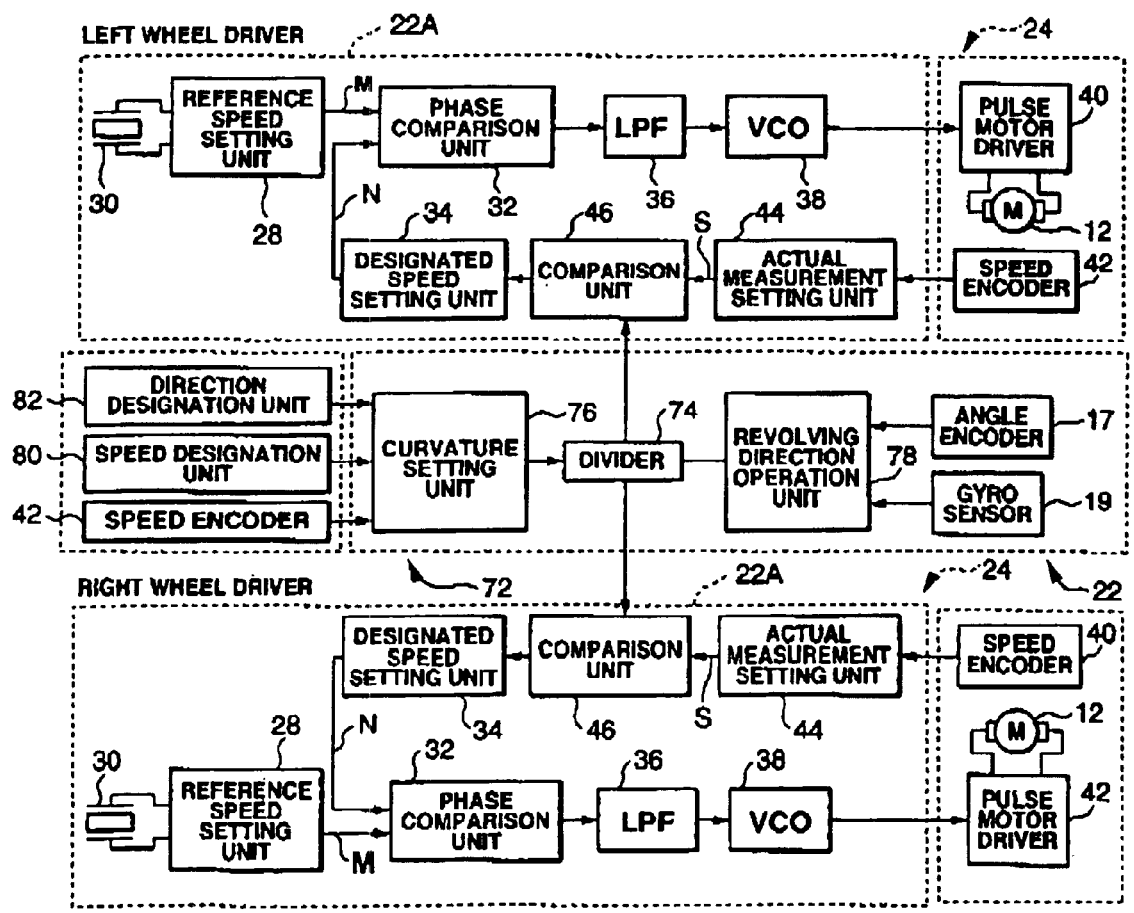
FIG. 2 is a control block diagram of the speed/steering control unit.

FIG. 2 shows the control block structure corresponding to the control operation performed by the speed/steering control unit 22. The foregoing speed/steering control unit 22 provides a drive wheel control signal necessary in running/steering the vehicle to each drive control unit 24 of the left and right rear wheels.

Next, the speed control of the vehicle is explained. Although the foregoing drive control unit 24 exists for each of the left and right rear wheels, the drive control unit of the left wheel and that of the right wheel are the same. Thus, only one of the control units will be explained, and the description of the other control unit will be omitted.

The drive control unit 24 comprises a PLL (Phase Locked Loop) control circuit 22A, which is of a phase control system. The reference speed setting unit 28 comprises a structure of dividing the frequency signal from the crystal oscillator 30 with the M value corresponding to the designated speed of the vehicle (designated by the speed designation unit 80 described later) and outputting a reference frequency signal M. The reference frequency signal M is input to the phase comparison unit 32.

A frequency signal N is input to the phase comparison unit 32 from the designated speed setting unit 34, and the phase comparison unit 32 compares the frequency signal M and frequency signal N and outputs the phase difference thereof as the phase difference signal to the LPF (Low Pass Filter) 36. The LPF 36 outputs the control voltage signal, which is obtained by eliminating high frequency components such as noise upon integrating the phase difference signal, to the VCO (Voltage Control Oscillation Circuit) 38. The clock signal from the VCO 38 is sent to the pulse motor driving driver 40 for driving the foregoing pulse motor 12 of the driving unit 24. Thus, the pulse motor driver 40 controls the drive of the pulse motor 12 in accordance with the phase difference signal of the phase comparison unit 32.

The pulse motor 12 is provided with a rotation speed encoder 42. This speed encoder 42 outputs a pulse signal corresponding to the rotation of the respective rear wheels. This encoded signal is set as the frequency signal S of the rear wheel driving motor in the actual measurement setting unit 44.

This frequency signal S is input to the comparison unit 46. In the comparison unit 46, the frequency signal distributed for each of the left and right wheels with the distribution unit 74 and corresponding to the designated rotational speed of the respective rear wheels and the actual measurement frequency signal S are compared to calculate the difference between the two, and the distribution unit 74 decides whether the rotation of the rear wheels should be increased or decreased, as well as with what degree of acceleration the rotation should be increased or decreased in order to determine the N value (divided value), and distributes this to the comparison unit 46 of the respective drive wheels. The comparison unit 46 or the designated speed setting unit 34 N divides the frequency signal S and sets this as the designated speed frequency signal in the designated speed setting unit 34. The designated speed frequency signal N is output from the designated speed setting unit 34 to the phase comparison unit 32.

Therefore, control in which the phase of frequency signal M and the phase of frequency signal N coincide is implemented as described above, and the rotation of the real wheels is controlled such that the vehicle speed is controlled to converge to the designated speed. According to the foregoing control structure, the control of rotational speed of the respective rear wheels is enabled with the PLL control system, and is conducted with ease and expedition.

During the braking of the vehicle, the left and right pulse motors are separated from the power source not shown in order to operate the motor as the power generator, and the generated power is supplied to the storage cell thereby. Further, during the sudden braking of the vehicle, in addition to the foregoing power generation with a motor, a special braking means such as a magnetic brake may also be used. Power may be generated with a motor for gradual braking or during non-acceleration, and a special braking means may be used in addition thereto for sudden braking.

In order to change the traveling direction of the vehicle 10, a rotation difference is provided to the left and right rear wheels 16B. Since the front wheels 16A are casters as described above, the traveling direction of the vehicle 10 is altered in accordance with the rotation difference of the left and right rear wheels 16B. In the speed/steering control unit 22, control is implemented for providing a rotational speed to the respective drive wheels so as to achieve the designated vehicle traveling speed while providing a rotation difference to the left and right rear wheels to the drive control unit 24 disposed independently to the left and right rear wheels 16B.

Figure 3:
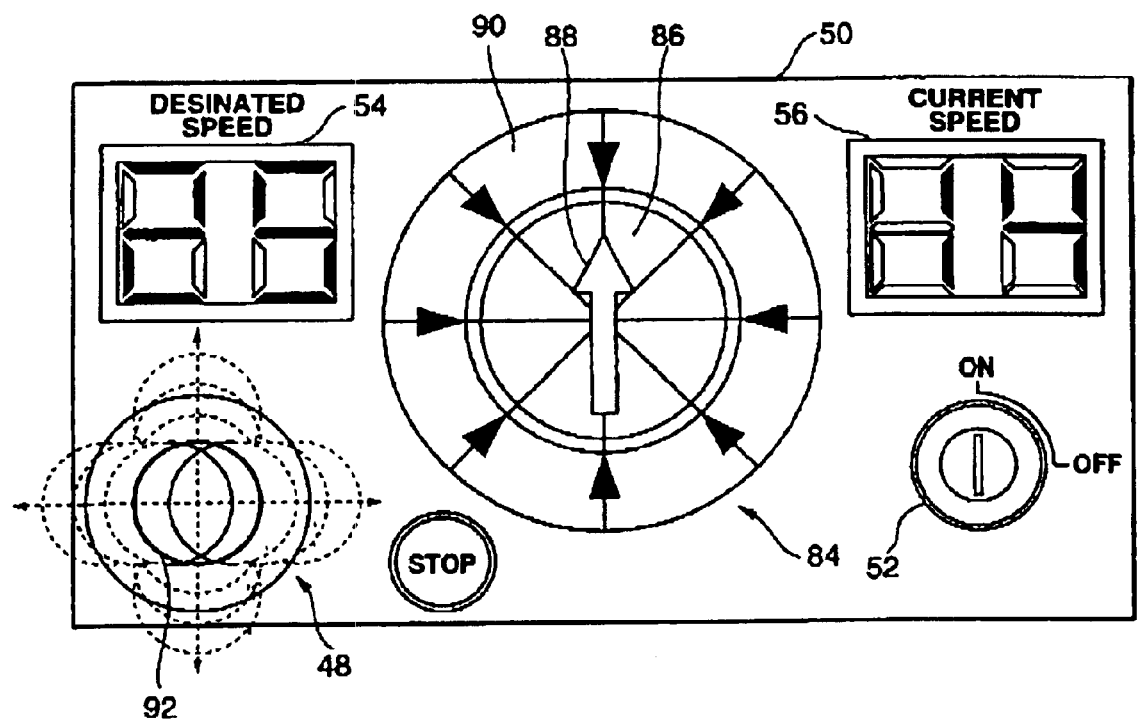
FIG. 3 is a front view of the instrument panel of the vehicle.

The speed/steering control unit 22 comprises a curvature setting unit 76 for setting the curvature radius upon turning the vehicle 10, and a turning direction operation unit 78 for computing the actual turning direction of the vehicle from the detected value from the sensor. Input to the curvature setting unit 76 are the designated speed from the speed designation unit 80 provided to the instrument panel 50 (c.f. FIG. 3) of the vehicles and the designated direction from the direction designation unit 82.

Moreover, the actual speed from the speed encoder 42 is also input to this curvature setting unit 76. Thereby, the curvature setting unit 76 calculates and seeks the optimum curvature from the designated turning direction, the designated vehicle speed (rotational speed of the drive wheels), and the actual speed, and this result is sent to the distribution unit 74. In other words, a sudden turn is allowed when the speed is slow, and the curvature radius will increase during high speed travel.

Meanwhile, a signal from the angle encoder 17 and gyro sensor 19 provided to the vehicle 10 is input to the turning direction operation unit 78, and, for example, the turning angle of the vehicle with the direction during direct advancement as the reference is calculated, and output to the foregoing distribution unit 74. At the distribution unit 74, the difference between the designated direction and actual direction, and the designated value N for driving the respective rear wheels 16B based on the designated speed are distributed and sent to the drive control unit 24 of the respective drive wheels.

FIG. 3 shows a frame format of an instrument panel 50 provided to the driver's seat to which the passenger of the vehicle 10 will board. An ignition key cylinder 52 is provided to this instrument panel 50, and the control of this drive system is enabled by the passenger inserting the key not shown into the ignition key cylinder 52 and turning the key to the ON position.

Further provided to the instrument panel 50 are a designated speed display unit 54 (80 in FIG. 2) for displaying the designated speed, and a current speed display unit 56 for displaying the current speed. The passenger is thereby able to visually compare the designated speed displayed on the designated speed display unit 54 and the current speed displayed on the current speed display unit 56. Moreover, although the display units 54 and 56 were respectively represented as a 7-segment display in FIG. 3, the representation may be a dot-matrix display or an analog display.

A display unit 84 (82 in FIG. 2) for displaying the traveling direction of the vehicle is provided between the designated speed display unit 54 and the current speed display unit 56. This traveling direction display unit 84 comprises a rotating disc 86 to which an arrow 88 is marked thereon, and indexes 90 for indicating the rotational quantum of the vehicle are provided around the periphery of the disc 86. When the vehicle is steered and the traveling direction thereof is changed, the disc 86 rotates such that the arrow 88 faces such direction, and, in accordance with the vehicle facing the designated direction, the arrow of the disc rotates so as to return to the position of direct advancement (display position of FIG. 3).

Further, a speed/turning direction designating operation stick 48 for designating the speed and turning direction is provided to the instrument panel 50. This operation stick 48 protrudes approximately perpendicularly from the panel, and may be tilted toward an arbitrary direction of front/back/left/right at a prescribed angle (c.f. dotted line of FIG. 3). Further, when the passenger removes his/her hand from such operation stick, it returns to the state of being approximately perpendicular as shown with the solid line in FIG. 3 with the biasing power of the biasing means not shown.

Designation of the vehicle speed and vehicle turning direction may be conducted independently depending on the direction this operation stick 92 is tilted, and the tilting to the front or back will increase/decrease the designated speed. In other words, for example, while the operation stick is tilted toward the front, the speed designation will increase, and the speed designation value will be established upon the passenger removing his/her hand from the operation stick 92. When the operation stick is tilted toward the back, the speed designation value will decrease. By tilting the operation stick 92 toward the left or right, the designation of the traveling direction of the vehicle; that is, the steering of the vehicle is enabled. For instance, when the operation stick is tilted toward the right, the disc 86 continues to rotate in the clockwise direction of FIG. 3 at a prescribed speed, and, when the operation stick 92 is released, the designated rotational angle of the vehicle will be established. The opposite will occur when the operation stick is tilted toward the left.

By controlling the speed of the respective left and right rear wheels 16B, a rotation difference will arise between the drive wheels, and the vehicle will begin to turn. Next, the disc 86 gradually begins to return to the position of the direct advancement of the vehicle, and the turning of the vehicle is completed once the disc returns to the position shown in FIG. 3.

Moreover, a stop key 62 is provided to the vicinity of the operation stick 92. The stop key is for instantaneously making the designated speed zero, and, by performing the ordinary stopping operation by pressing this stop key, control is performed such that the vehicle is decelerated at an optimum acceleration (minus) and stopped within a range that will not cause an abrupt braking. When this stop key 92 is operated, the display on the designated speed display unit 54 will become 0. Moreover, a separate key or pedal maybe separately provided for stopping the vehicle, particularly for the purpose of emergency braking.

Figure 4:
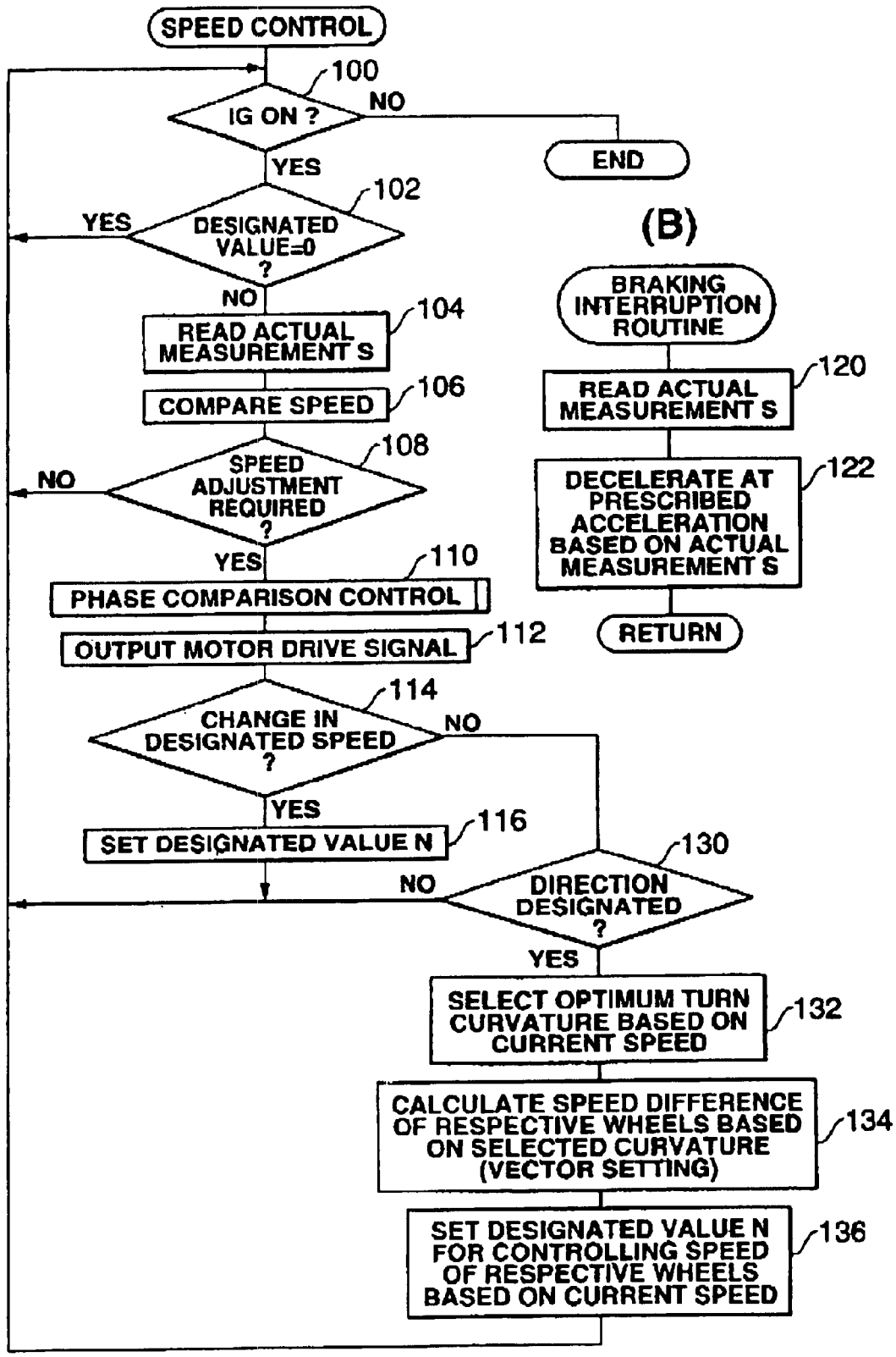
FIG. 4 is a flowchart for performing speed control.
Figure 5:
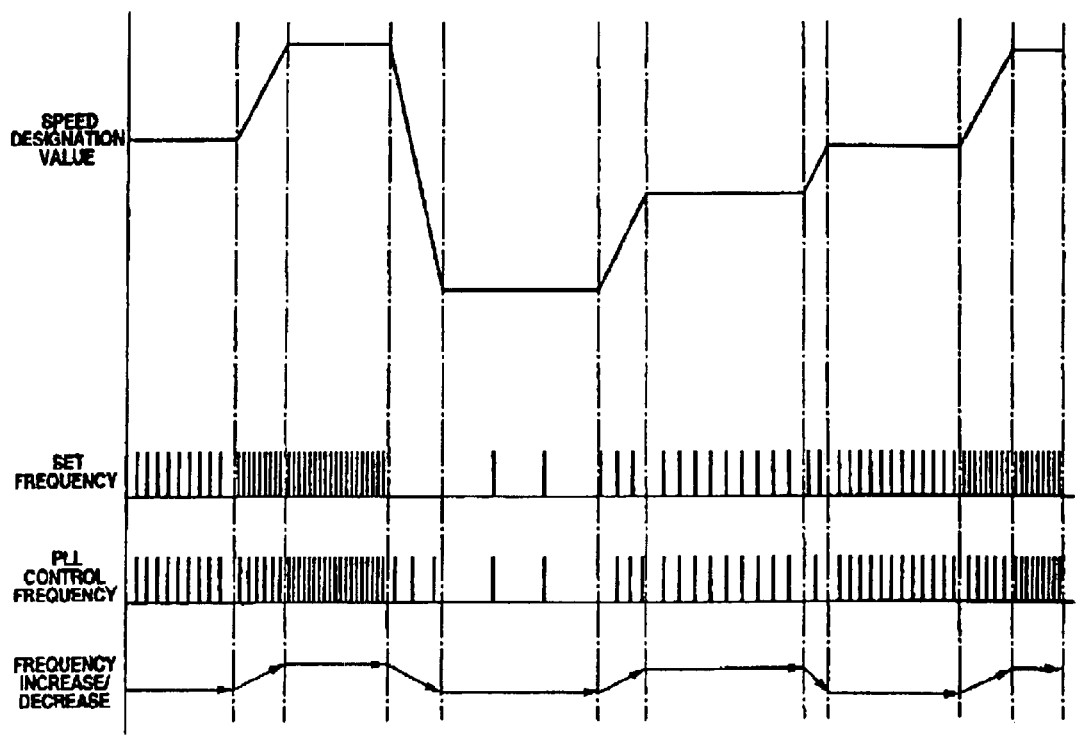
FIG. 5 is a timing chart for performing speed control.

The operation of the present embodiment is now described below with reference to the flowchart of FIG. 4 and the timing chart of FIG. 5.

Foremost, at step 100 of the speed control routine shown in FIG. 4(A), it is judged whether the key has been inserted in the ignition key cylinder 52 to place the vehicle in the ON state, and, when this is judged as positive, the routine proceeds to step 102.

At step 102, it is judged whether the designated speed is 0, and, when this is judged as positive, the routine returns to step 100 since the designated speed is 0. Moreover, when it is judged as negative in this step 102, the routine proceeds to step 104 since it is judged that there is a speed designation.

At step 104, the rotational speed of the respective rear wheels is measured with the speed encoder 42 and the actual measurement S thereof is read. At the subsequent step 106, the designated speed and actual speed of the vehicle are compared, and, when there is a speed difference between the two, since it is necessary to adjust the speed, it is judged in step 108 as to whether speed adjustment is required.

At step 108, when it is judged that speed adjustment is not required (negative judgment), it is determined that the current speed is stable at the designated speed, and the routine returns to step 100. Moreover, at step 108, when it is judged that speed adjustment is required, the routine proceeds to step 110 in order to perform speed control with PLL control. At step 110, as described above, the frequency signal phase is compared in the phase comparison unit 32, and the drive of the respective drive wheels is controlled based on the phase difference. In other words, as illustrated in step 112, frequency M to become the reference is supplied to the PLL circuit in order to control the drive of the electric motor 12 of the respective drive wheels such that the current rotational speed of the rear wheels becomes frequency N of the designated rotational speed.

At the subsequent step 114, it is judged whether the designated speed has been altered. In other words, it is judged whether the speed/turning direction operation stick 92 of the instrument panel 50 has been operated or not, and, when the designated speed has not been altered, the routine proceeds to step 130. At this step 130, it is judged whether a designation has been made regarding the turning direction. In other words, it is judged whether the operation stick 92 has been operated in the left or right direction of FIG. 3, and, when judged as negative, the routine returns to step 100, and the travle of the vehicle 10 is controlled at the current designated speed and traveling direction.

Here, when the designated speed has been altered at step 114, since the operation result of the speed difference at the comparison unit 46 will change, the routine proceeds to step 116 in order to set the frequency signal N corresponding to the designated speed, and, thereafter, the speed is controlled with the frequency signal N after the alteration thereof.

Figure 6:
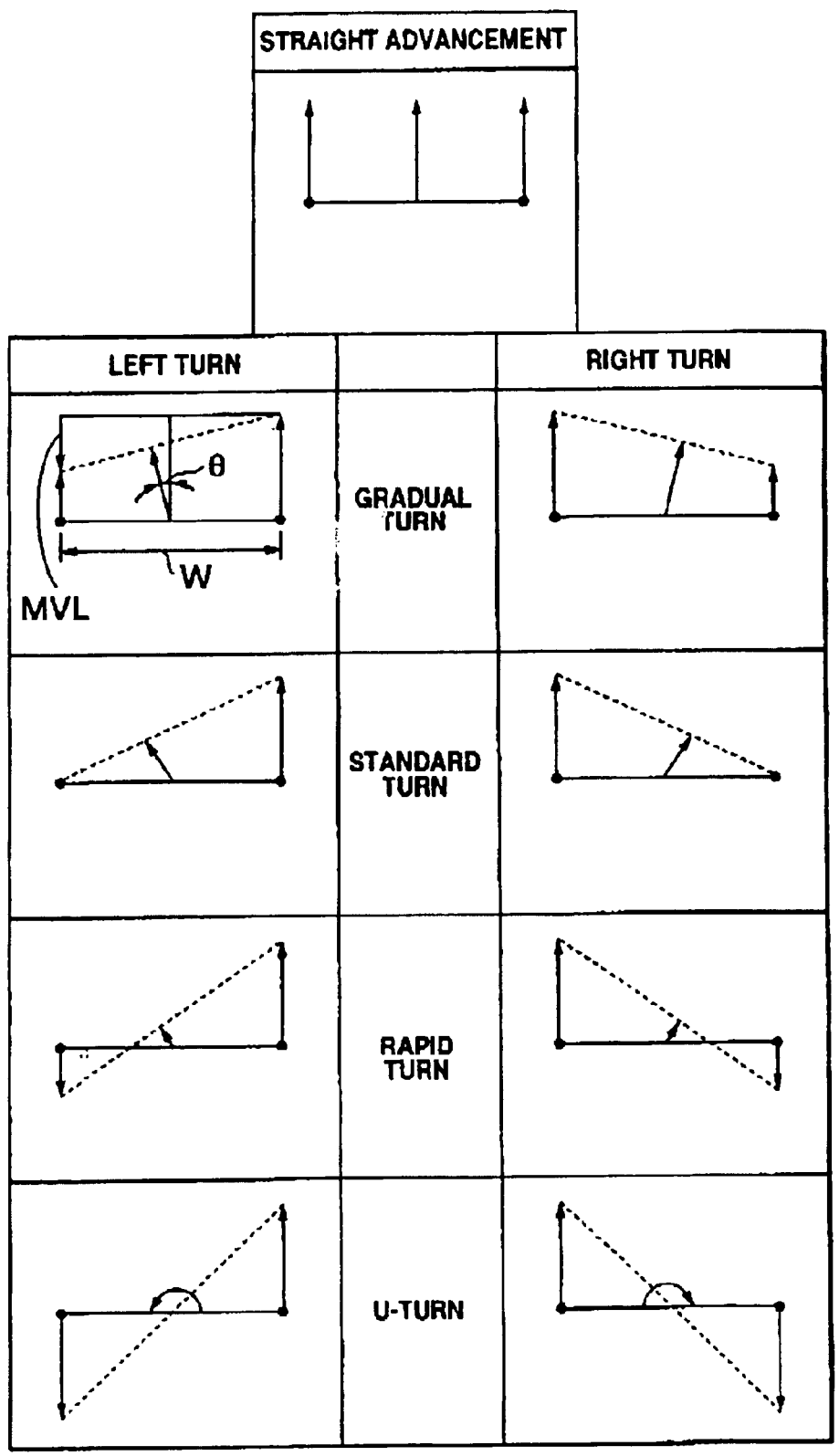
FIG. 6 is a characteristic diagram showing the turning pattern of the vehicle.

Further, when a direction designation is made at step 130, the routine proceeds to step 132, and the optimum turning curvature of the vehicle is selected based on the current speed. In the present embodiment, the curvature to be selected in the respective driving wheels in conformity with the curvature of the vehicle is determined as shown in FIG. 6. In other words, for direct advancement, the left and right rear wheels 16B are driven at an equal speed. With this as the reference, when turning left, there is a pattern of making the left rear wheel 16B at ½ the drive speed of the right rear wheel, a pattern of stopping the drive of the left rear wheel 16B, a pattern of reversing the left rear wheel 16B at ½ the drive speed of the right rear wheel 16B, and a pattern of reversing the left rear wheel 16B at the same drive speed of the right rear wheel 16B.

Moreover, when turning right, there is a pattern of making the right rear wheel 16B at ½ the drive speed of the left rear wheel 16B, a pattern of stopping the drive of the right rear wheel 16B, a pattern of reversing the right rear wheel 16B at ½ the drive speed of the left rear wheel 16B, and a pattern of reversing the right rear wheel 16B at the same drive speed of the left rear wheel 16.

For example, FIG. 6 explains an example of the vehicle making a gradual left turn. The mathematization of the operational status of this vehicle can be represented as follows:

$$\cos \theta = W/W^2\sqrt{+MVL^2} \quad (1)$$

$$MVL = W \cos^2\sqrt{\theta - 1} \quad (2)$$

θ: Angle of direction for turning against the direct advancement (current direction of advancement).
W: Pitch measurement of the left and right rear wheels.
MVL: Linear velocity difference per time unit of the left and right rear wheels.

Each of these patterns are classified into a gradual turn, standard turn, rapid turn, and U-turn of the vehicle, and selected as the drive mode of the respective drive wheels in accordance with the vehicle speed.

When the curvature radius pattern of the traveling direction of the vehicle is selected at step 132, the routine proceeds to step 134 and calculates the rotational speed difference of the respective rear wheels 16B based on the selected curvature, and, at the subsequent step 136, the aforementioned designated value N for controlling the speed of the respective rear wheels 16B based on the current speed is set, and the routine then returns to step 100.

When the stop key 62 is operated during the control routine described above, the braking interruption routine shown in FIG. 4(B) is activated, and, in addition to the actual measurement S of the motor rotation being read at step 120, deceleration at a prescribed acceleration (minus) based on the actual measurement S is commenced at step 122. As a result, the vehicle 10 will stop after the vehicle speed is converged to zero.

Next, control from the phase control unit 32 to the driver 40 via the VCO 38 is explained with reference to the timing chart illustrated in FIG. 5 in a case where the vehicle 10 is actually driven by repeating acceleration and deceleration. Moreover, in FIG. 5, explained as the control parameters are the speed designation value, set frequency signal N, PLL control frequency signal M, and vector value representing the frequency increase/decrease.

Although the example shows a mode where the vehicle 10 is advancing directly forward, when the vehicle is steered, each of the rear wheels is controlled at a different speed designation value so as to generate a rotational speed difference in the respective wheels 16B. Exemplified is the change in the speed designation value against the time axis, and the upward direction of the vertical axis represents high speed, and the downward direction represents low speed. Moreover, the vector display corresponding to the frequency increase/decrease implies that the frequency of the set frequency signal N is being increased (accelerated) in order to increase the rotational speed of the motor when the vector is facing the upward direction in the diagram, and, contrarily, implies that the frequency is being lowered (decelerated) when facing the downward direction. Further, when the vector is parallel against the time axis, such portion implies that the vehicle is being maintained in a constant speed state upon making the frequency of the set frequency signal N to be constant.

When the speed designation value is raised, the set frequency N foremost becomes higher in accordance therewith, and the PLL control frequency M thereafter becomes higher (area in which the frequency vector turns upward). Further, when the speed designation value of the vehicle is lowered, the set frequency N foremost becomes lower in accordance therewith, and the PLL control frequency M thereafter becomes lower (area in which the frequency vector turns downward). Further, when maintaining the speed, the set frequency N and the PLL control frequency M coincide (area in which the frequency vector is horizontal). The aforementioned control is realized with the PLL control system based on the phase difference between frequency signals N and M.

As described above, with the present embodiment, the frequency phase comparison control with the PLL circuit is employed in the speed control of the vehicle 10, and, since the PLL circuit is used to control the drive status of the pulse motor 12, the vehicle speed is automatically increased or decreased to the previously designated speed. Further, since the vehicle travels steadily at this speed when the vehicle speed reaches the designated speed, burden on the passenger can be alleviated. This type of speed control is optimum for the control of electric wheelchairs. Further, according to the foregoing speed control, since the passenger is not required to needlessly increase the vehicle speed, the power consumption of the electric motor can be kept to a minimum, and this is optimum in vehicles where power is limited; for example, in future solar cars and the like.

Since the turning direction of the vehicle is designated by tilting the operation stick 92 toward the left or right in the foregoing electric vehicle in order to automatically turn the vehicle at an optimum curvature as described above, the vehicle may be steered easily. Further, since the independent control of the left and right rear wheels for providing a rotation difference to the left and right rear wheels is realized with PLL control, the turning motion of the vehicle is achieved with favorable precision and response.

Although a turning pattern as illustrated in FIG. 6 is set in advance with the present embodiment, there is no need to fix such patterns, and the rotation difference of the left and right drive wheels may be computed and sought in real time from the detected value of the traveling state of the vehicle.

Further, in the present embodiment, the speed encoder 42 is employed as the speed detection means, and, by monitoring the rotation of the pulse motor 12, the speed of the vehicle 10 is obtained. Nonetheless, the speed may also be detected by employing a non-contact sensor which emits a laser beam or infrared ray from a light emitting element toward the road surface, detects the reflection thereof, and analyzes the AC component.

As this type of non-contact speed probe, broadly employed may be those which are well-known and applied to technology for detecting the movement speed of mice of PCs or the speed of a baseball or golf ball (For example, please refer to Japanese Patent Laid-Open Publication No. H6-313749, or Japanese Patent Laid-open Publication No. H7-134139.).

As a result of employing this type of non-contact sensor, for example, it is possible to prevent the erroneous speed detection during the idling in a case where the speed encoder 42 is provided to the actuator (pulse motor 12) as described in the present embodiment.

Moreover, when disposing the speed encoder 42 in a wheel which does not have a driving force; for example, an auxiliary wheel, the rotational lock speed will be detected with the auxiliary wheel locking phenomenon pursuant to an external object. This kind of inconvenience can also be overcome by employing a non-contact sensor.

Moreover, in the present embodiment, the designated speed is increased/decreased by tilting the operation stick 92 toward the front or back, and the value of the designated speed will rise while the rod is being tilted forward, and established when the operation stick 92 is released. Nevertheless, the structure may be such that the speed is set pursuant to the angle of such tilting. In such a case, by tilting the operation stick 92 toward the left or right while such stick is being tilted at a prescribed angle for setting the speed, the designation of the traveling direction of the vehicle is enabled.

Figure 7:
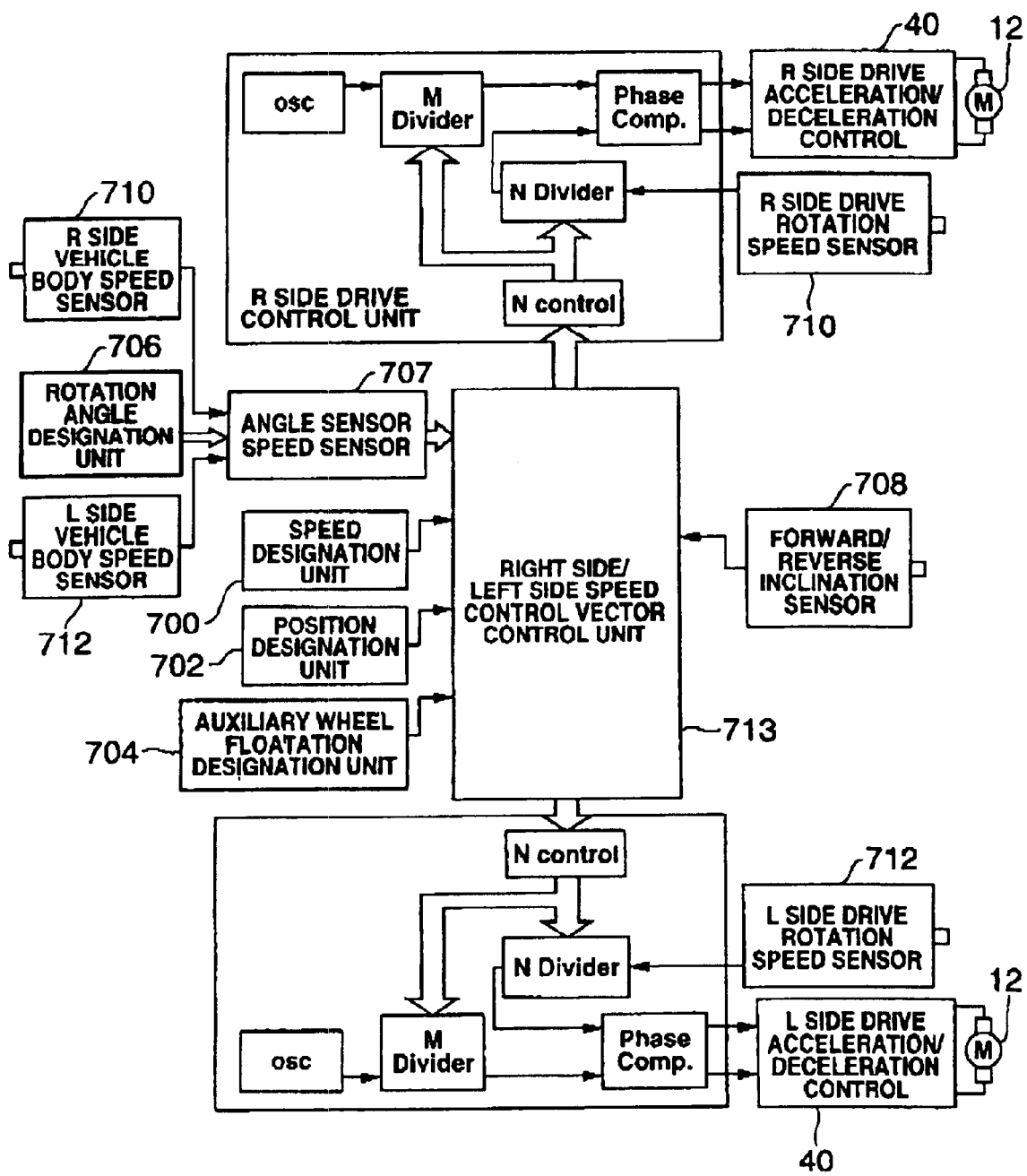
FIG. 7 is a structural diagram of the control block of a direction control device according to another embodiment.

Next, another embodiment of the present invention is explained with reference to FIG. 7. FIG. 7 is a structural diagram of the control block pertaining to the present embodiment. In FIG. 7, the speed designation unit 700 is an accelerator pedal and related equipment for designating the vehicle speed to the speed control means described later, and reference numeral 702 is a position designation unit; that is, a transmission, and is used to selected park, neutral, drive, reverse, or rotate. The drive mode or reverse mode implies that the left and right rear wheels (drive wheels) are rotated in the same direction to advance or retreat the vehicle, and rotate is a state of rotating the vehicle by rotating the left and right rear wheels in mutually opposite directions.

The auxiliary wheel floatation designation unit 704 is an operation means that is operated upon floating the front wheels 16A, or auxiliary wheels, which are non-drive/non-steered wheels, from the ground surface (road surface) while the vehicle is traveling forward. The rotation angle designation unit 706 is for designating the moving direction (rotational angle) of the vehicle to the speed vector control unit described later with a steering wheel as the steering means. The steering state of the vehicle may be detected with a steering angle sensor, steering angle speed sensor 707, and the like.

The front/rear tilt sensor 708 is for detecting the tilt of the vehicle in the front and rear directions, and, for example, is described in Japanese Patent Laid Open Publication No. H6-270630. The rotational speed sensor 710 of the R side drive wheel is the rotary encoder for detecting the rotational angle speed of the right rear wheel. The L side drive wheal rotational speed sensor 712 is a sensor for the left rear wheel. The right side/left side speed control vector control unit 713 is structured from a microcomputer, and is supplied signals from the foregoing rotation angle designation unit 706, rotational speed sensors 710, 712 for each of the left and right rear wheels, a position designation unit 702, a speed designation unit 700, and an auxiliary wheel floatation designation unit 704, and performs necessary processing for rotationally driving the left rear wheel and the right rear wheel independently with appropriate rotational characteristics (speed vector) based on the drive program previously stored in the memory pursuant to such signals.

Figure 8:
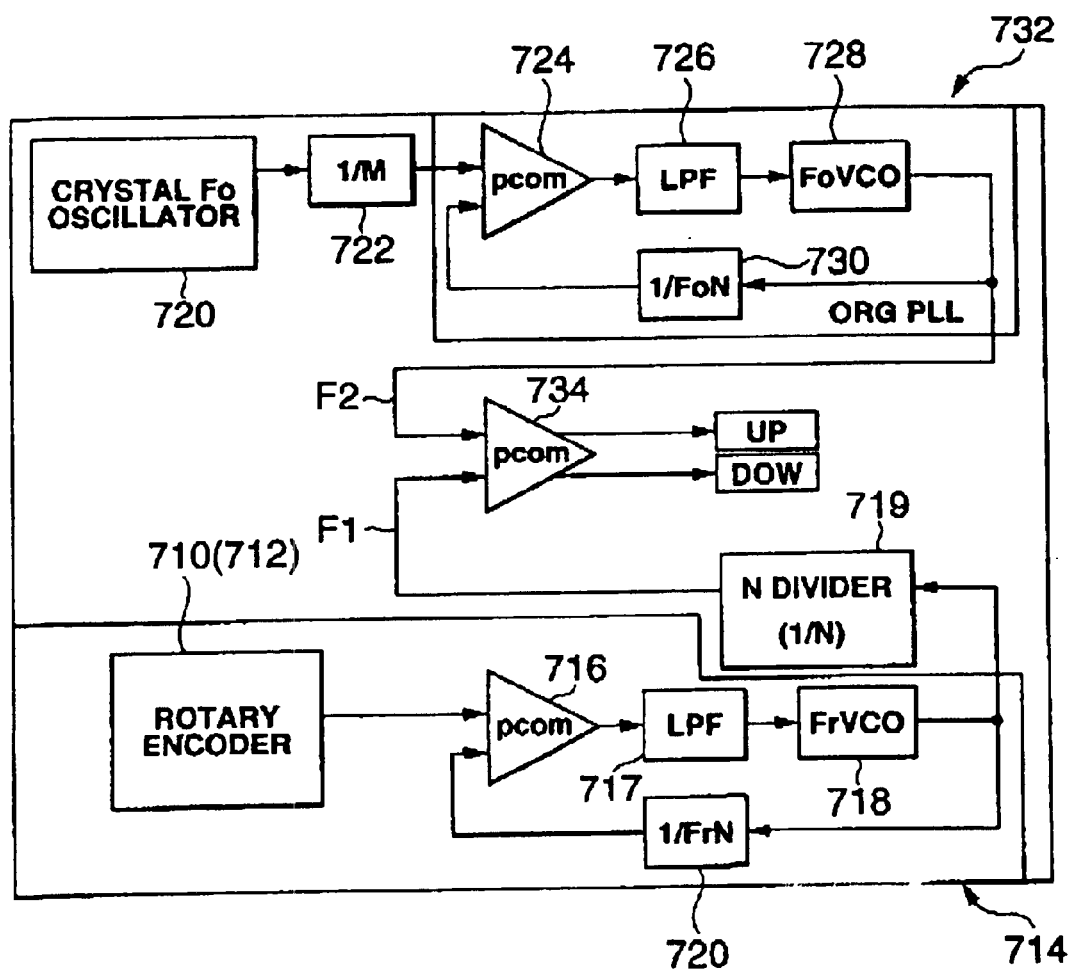
FIG. 8 is a block diagram showing in detail the rotation control circuit (drive control means) provided to each rear wheel.

FIG. 8 is a block diagram showing in detail the control circuit (drive control means) for rotating the foregoing electric motor provided to the respective rear wheels, and this control circuit is mainly structured of a PLL circuit. The signal from the drive rotational speed sensor 710, 712 is converted into a sampling signal to be compared with the reference frequency signal described later with the PLL control circuit 714. In other words, the signal of the rotary encoder 710, 712 is input to the phase comparison unit 716, and the frequency signal from the voltage control oscillator 718 is compared with the phase of the frequency signal 1/Fr N divided with the divider 720. The phase difference detection signal from the phase comparison unit 716 is supplied to the foregoing voltage control oscillator 718 via the low pass filter 717. The frequency signal from the voltage control oscillator 718 is divided in the N divider 719. As a result, a sampling frequency signal to be compared with the reference frequency signal described later is created from the sampling signal from the rotary encoder.

Meanwhile, the oscillation frequency from the crystal oscillator 720 is 1/M divided with the M divider 722 and supplied to the phase comparison unit 724, and thereafter returned to the phase comparison unit 724 via the low pass filter 726, voltage control oscillator 728 and the N divider 730. The reference frequency signal in which the frequency was made constant with the PLL control circuit 732 is supplied to the phase comparison unit 734.

The phase difference of the sampling signal F1 and the reference frequency signal F2 of the foregoing rotary encoder is compared with the phase comparison unit 734, and a control signal is supplied to the drive control device (acceleration/deceleration control device) of the stepping motor 12 for driving the rear wheels based on this phase difference.

The foregoing speed control vector control unit 713 sets the M value of the M divider 722 and the N value of the N divider 719 from the values representing the various operational statuses such as the vehicle speed or the rotational speed of the drive wheels. In other words, in the respective speeds of the vehicle, for example, an M value and N value conforming with the reference frequency, sampling frequency and phase are previously simulated and stored as a memory table in a prescribed area of the microcomputer memory. Then, such M and N values are read from the vehicle speed (target speed, detected speed, etc.), and are designated as the M or N value of the dividers 720*m* 719 of the PLL circuit.

Figure 9:
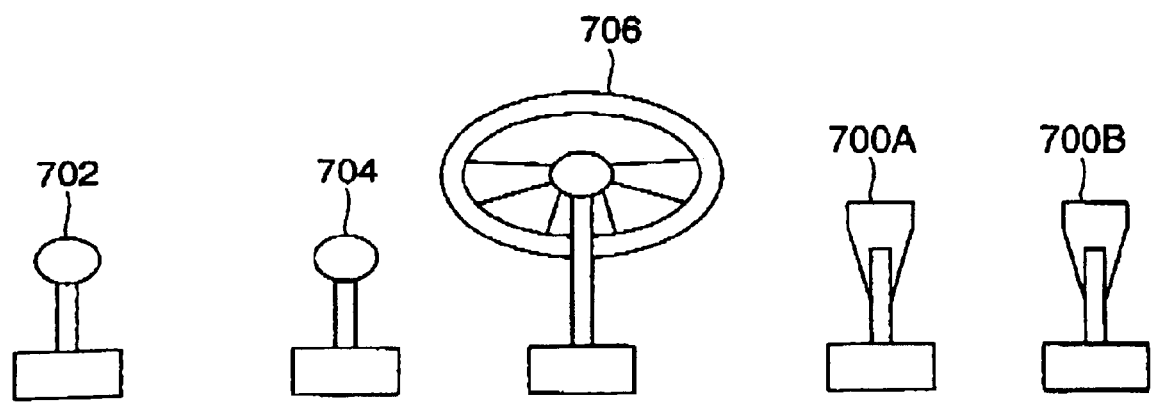
FIG. 9 is a frame format showing the appearance of the position designation unit, auxiliary wheel designation unit, rotation angle designation unit, braking designation unit and speed designation unit shown in FIG. 7.

FIG. 9 is a frame format showing the appearance of the foregoing position designation unit, auxiliary wheel designation unit, rotation angle designation unit, braking designation unit and speed designation unit depicted in FIG. 7. The position designation unit 702 and auxiliary wheel designation unit 704 are structured as a lever, the rotation angle designation unit 706 is structured as a steering wheel, and the speed designation unit 700 is structured from a brake pedal 700A and an accelerator pedal 700B. Reference numeral 707 is a sensor for detecting the steering angle and steering speed of the steering wheel.

Figure 10:
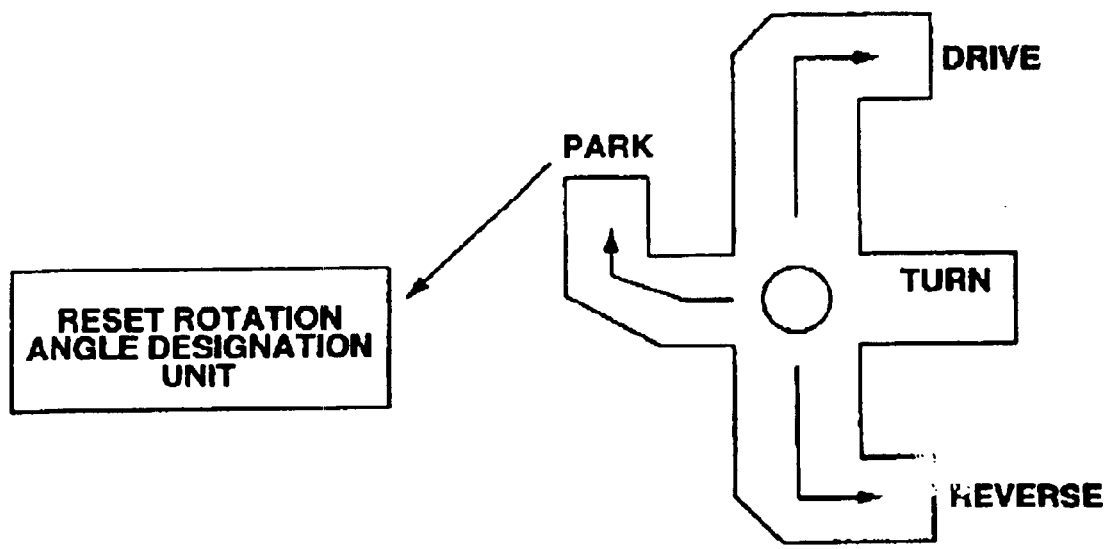
FIG. 10 is a diagram showing the tilt pattern in the position designation unit.
Figure 11:
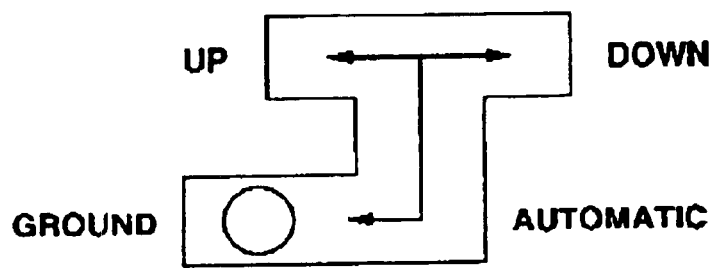
FIG. 11 is a diagram showing the tilt pattern in the auxiliary wheel floatation designation unit.

As shown in FIG. 10, the lever operation patterns of the position designation unit may be switched in five stages; namely, drive, reverse, park, rotate and neutral. As illustrated in FIG. 11, the auxiliary wheel floatation designation unit maybe broadly separated into a mode (ground) which does not float the auxiliary wheel from the ground surface and an auxiliary wheel floatation mode (automatic), and, in the latter mode, the lever may be further changed to a mode (up) for decreasing the floatation of the auxiliary wheels per operation, and, contrarily, a mode (down) for increasing the floatation of the auxiliary wheels. When the operation lever is shifted to a position for floatation, the operation lever is biased to an automatic position, and will automatically return to this position after being operated to the down side or up side.

Control for floating the auxiliary wheels is now explained in detail. The auxiliary wheels 16A have a role of supporting the vehicle when it is parked, traveling at a slow speed, or rotating, but will become a resistance when the vehicle is traveling at medium or fast speeds. The foregoing electric vehicle is a rear wheel drive, and the center of gravity of such vehicle is relatively toward the rear of the vehicle since the drive system such as the motor and peripheral devices such as the battery are placed toward the rear side. Thus, when the vehicle is traveling at medium or fast speeds, particularly during direct advancement, the vehicle will be able to travel steadily even though the auxiliary wheels are floating from the ground surface.

By controlling the centroid position of the vehicle to conform to the traveling state of the vehicle, traveling with the front wheels floating can be realized. A device or means for altering the centroid position is disclosed, for example, in Japanese Patent Laid Open Publication No. H6-245625. For instance, the auxiliary wheels may be floated while the vehicle is traveling, and, when the vehicle proceeds to a constant speed travel, the centroid position of the vehicle may be moved form the reference position to a position toward the rear of the vehicle enabling the maintenance of the floatation posture of the front wheels with a centroid shifting device. Pursuant to this shift in center of gravity, the vehicle will travel at a constant speed with this vehicle posture of the front wheels being afloat.

During the deceleration of the vehicle, a vector trying to ground the auxiliary wheels will be inflicted on the front part of the vehicle, but the floatation of the auxiliary wheels can be maintained by moving the centroid position further toward the rear of the vehicle. In the case of a large deceleration, since there is no need to maintain the floatation of the auxiliary wheels there is no need to move the centroid position further toward the rear of the vehicle. Thus, the centroid position should be returned to the reference position corresponding to the state where the vehicle is parked. When the vehicle is steered, from the perspective of stabilizing the vehicle posture, it is desirable that the centroid position be altered to a direction of grounding the auxiliary wheels.

Figure 12:
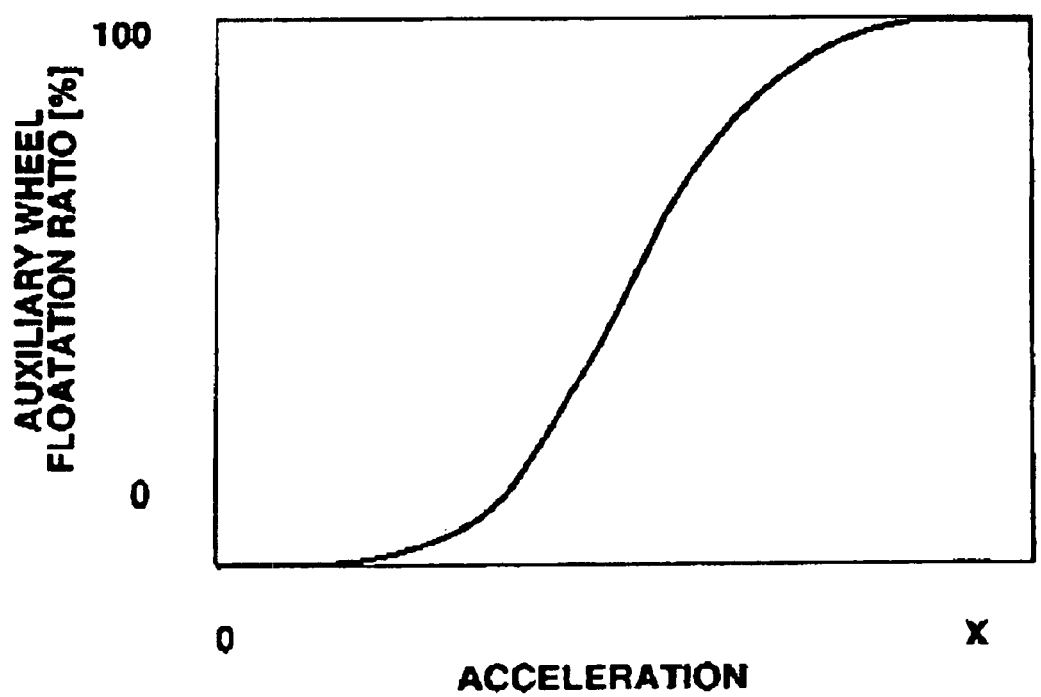
FIG. 12 is a characteristic diagram showing the relationship between the auxiliary wheel floatation ratio and the vehicle acceleration.
Figure 13:
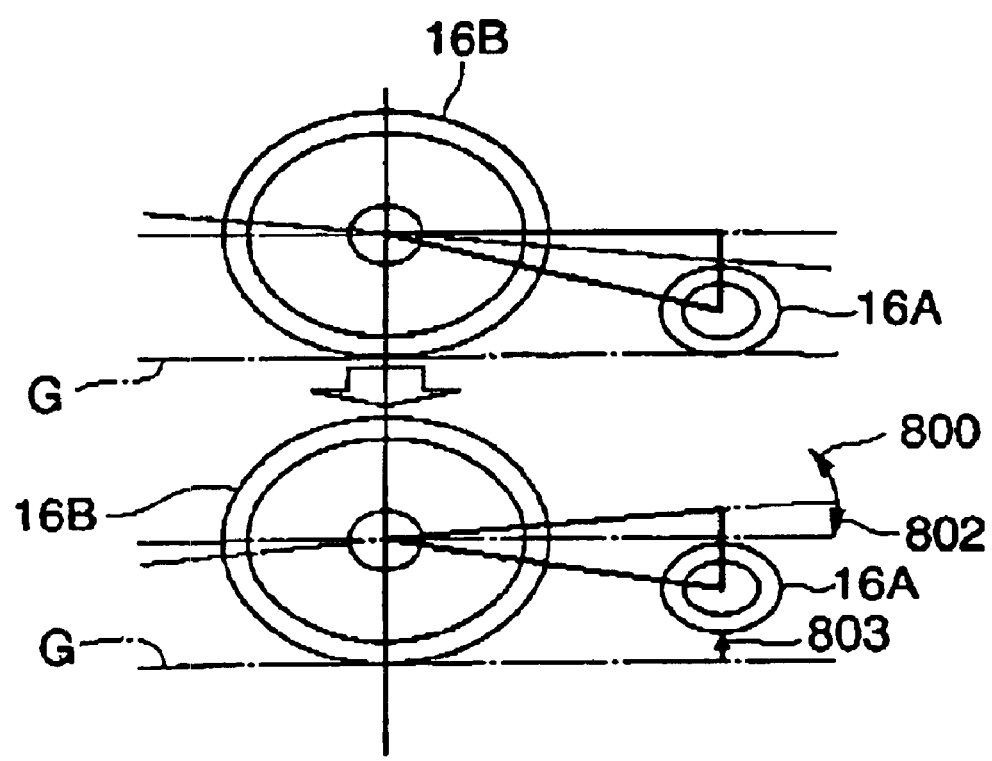
FIG. 13 is a frame format showing the floating state of the auxiliary wheels.

FIG. 12 is a characteristic diagram showing the relationship between the acceleration and auxiliary wheel floatation ratio, and, pursuant to the increase in acceleration, the auxiliary wheel floatation ratio will increase when the vehicle centroid is made constant. The auxiliary wheel floatation ratio being 100% implies that the auxiliary wheels are floating completely from the ground surface, and the floatation ratio being 0% implies that the auxiliary wheels are contacting the ground at length such as when the vehicle is parked. Floatation of the auxiliary wheels is, for example, 10 cm at maximum. FIG. 13 shows a state where the auxiliary wheels are contacting the ground to a state where they are floating. When the auxiliary wheels 16A are to float from the road surface G, a floatation vector 800 opposite the gravity acceleration is added to the auxiliary wheels, and, since the rear wheels (drive wheels) 16B are in contact with the ground, the auxiliary wheels will float from the ground surface as shown with reference numeral 803 with the floatation vector 800 in resistance with the gravity 802. When the vehicle arrives at the constant speed, the center of gravity of the vehicle is shifted toward the rear to balance the vehicle and in order to maintain the floating state of the auxiliary wheels. The distance of moving the center of gravity is suitably controlled with the vehicle speed or the like.

Next, the operation of the control block illustrated in FIG. 7 and FIG. 8 will be explained with a focus on the control operation implemented with the CPU of the speed control vector control unit 713. Foremost, the CPU reads the signals from the steering sensor/speed sensor 707, the speed designation unit 700, the position designation unit 702, and the auxiliary wheel floatation designation unit 704. The CPU then seeks the steering angle and steering speed from the signal from the steering sensor 707, seeks the vehicle designated speed (target speed) from the manipulated variable of the speed designation unit 700, seeks the shift position pursuant to the signal from the position designation unit 702, and seeks the control status of the auxiliary wheel floatation pursuant to the signal form the auxiliary wheel floatation designation unit 704. Moreover, the CPU calculates the rotational speed or integrated revolution of the respective left and right drive wheels based on the pulse signal from the rotary encoder 710, 712 in order to calculate the traveling speed and traveling direction of the vehicle.

The CPU calculates the drive status (rotational angle speed, rotational angle acceleration, etc.) designated for each of the left and right drive wheels, decides the M value from such calculated value and sets this to the M divider 722, and similarly decides the N value and sets this to the N divider 719.

The PLL circuit 732 divides the transmitted frequency signal from the crystal oscillator 720 with the set M value, structures a reference transmitted frequency signal, and outputs this to the phase comparison unit 734. Meanwhile, the PLL circuit 714 divides the detection signal from the rotary encoder 710 (712) with the set N value, structures a detected frequency signal, and outputs this to the phase comparison unit 734.

The phase comparison unit 734 seeks the phase difference of these frequency signals, and outputs a signal (UP) for increasing the rotation of the electric motor from this phase difference, or a signal (DOWN) for decreasing the rotation of the motor to the driver circuit of the electric motor. The control of these drive wheels is performed for each left and right wheel for placing the vehicle in drive or reverse, or turning the vehicle toward the right side of the advancing direction, or turning the vehicle toward the left side of the advancing direction, or rotating the vehicle on its axis. When the detected revolution of the drive wheels has not reached the designated value, the UP signal is supplied to the motor driver, and, when the revolution of the drive wheels exceeds the designated value, the DOWN signal is supplied to the motor driver.

When the UP signal is supplied to the motor driver, the revolution of the electric motor is increased, and, contrarily, when the DOWN signal is supplied to the motor driver, the electric motor is separated from the power source and will function as a power generator. In a state where no phase difference, or hardly any phase difference is acknowledged, the motor will operate so as to maintain the current revolution.

Figure 14:
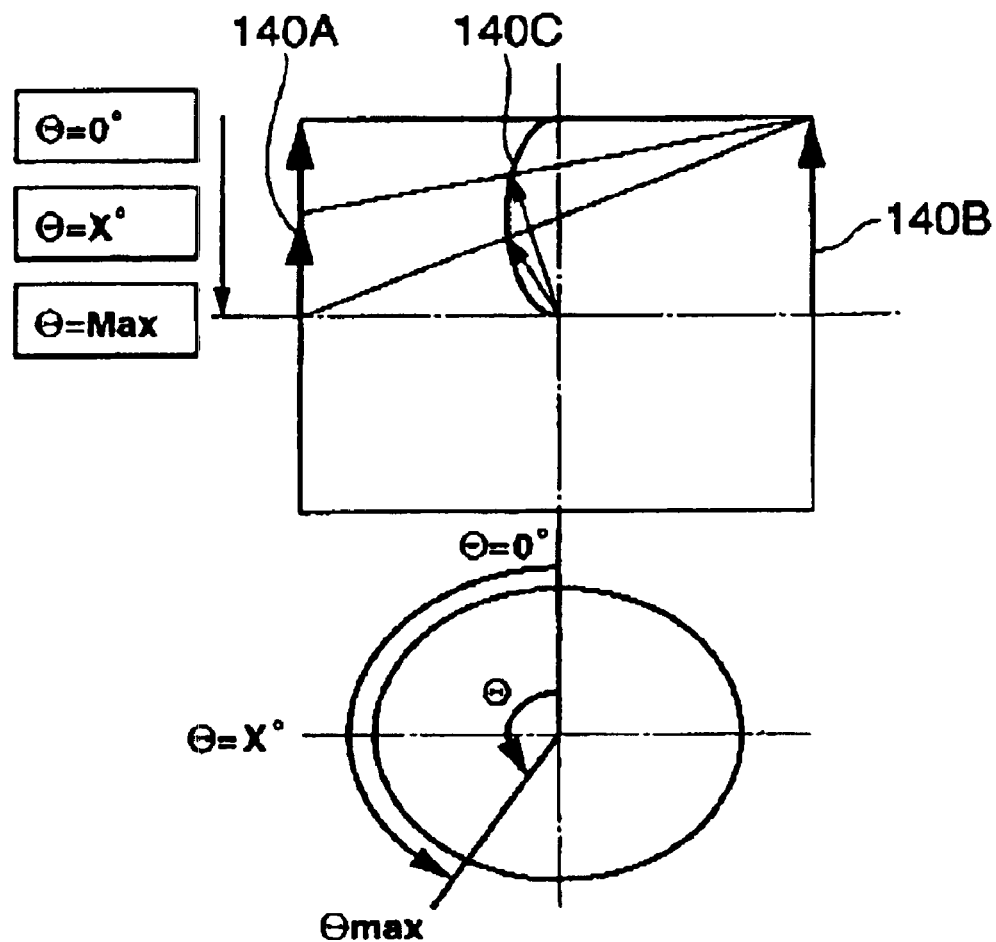
FIG. 14 is a frame format showing the relationship between the steering direction of the steering wheel and the vehicle direction.

Although the control of the speed vector pursuant to the rotational status of the respective drive wheels is approximately the same as FIG. 6, in the present embodiment, the steering means has been changed from the operation stick to a steering wheel. The operation of the steering wheel and the control status of the speed vector of the respective drive wheels are now explained with reference to FIGS. 14 to 16. FIG. 14 shows a case where the steering wheel is steered in the counterclockwise direction while the vehicle is advancing forward. In accordance with the steering angle ($\theta$) of the steering wheel, the rotational speed vector 140A of the left rear wheel is controlled to a value smaller in comparison to the rotational speed vector 140B of the right rear wheel, and the vehicle speed vector 140C takes the path illustrated in FIG. 14 upon steering the steering wheel to the counterclockwise direction and thereafter returning it to the clockwise direction along the rotation of the vehicle. As a result, the vehicle will return to the direct advancement state after turning in the left or right direction. Moreover, when the steering wheel is steered up to the maximum angle ($\theta$Max), the rotational speed vector of the left wheel will become 0. The difference in size of the rotational speed vector of the left and right rear wheels may be suitably changed with steering characteristics such as the steering angle and steering speed of the steering wheel.

Figure 15:
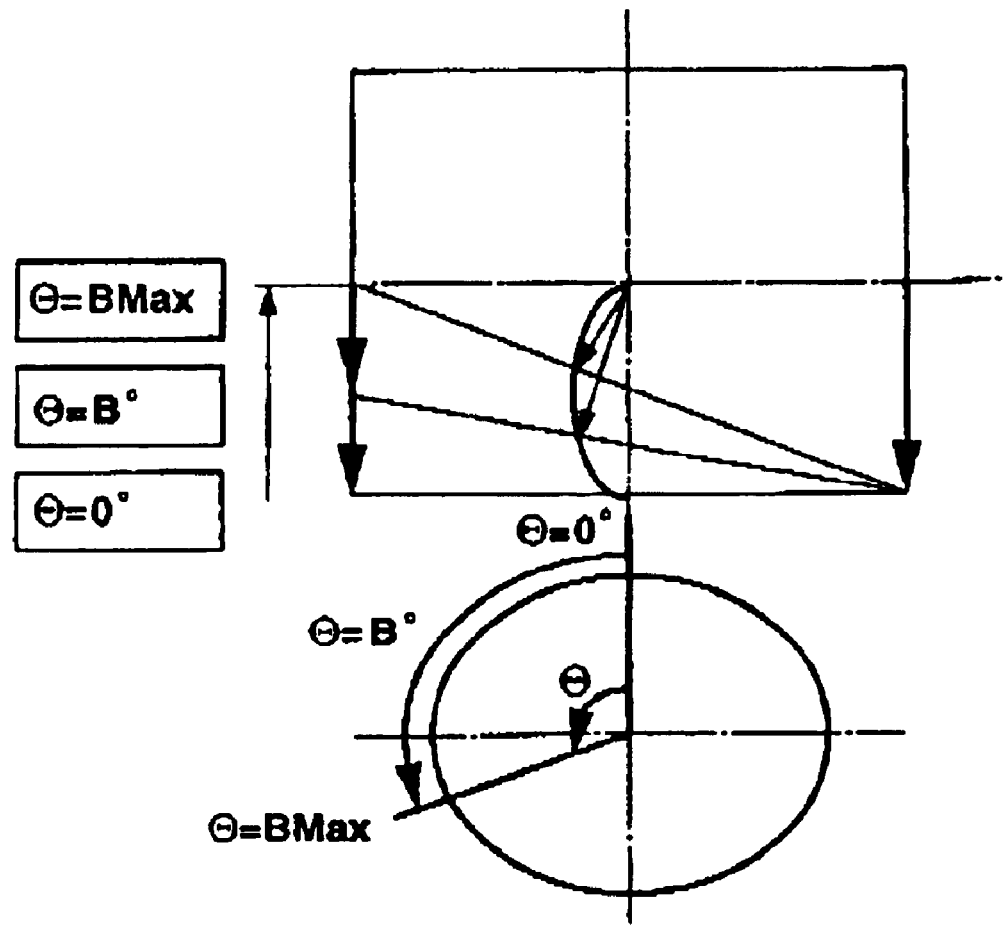
FIG. 15 is a second frame format showing the relationship between the steering direction of the steering wheel and the rotational direction of the vehicle.
Figure 16:
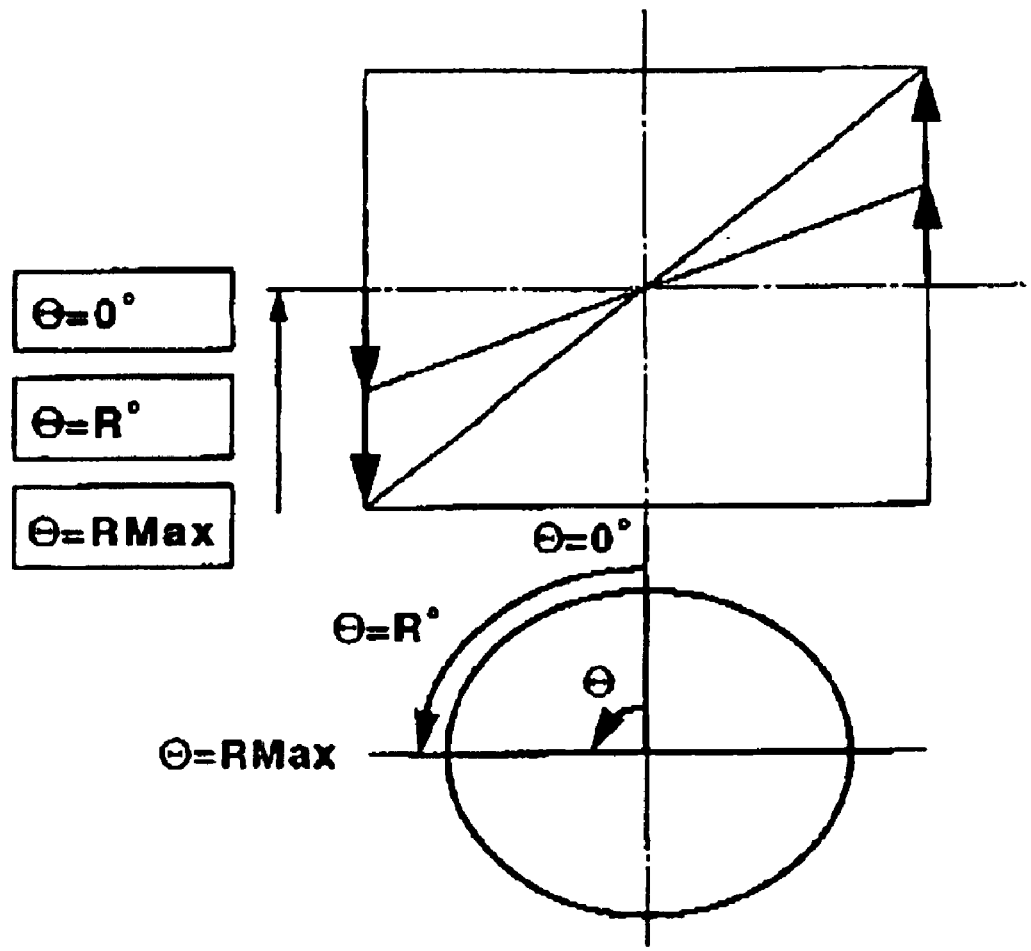
FIG. 16 is a third frame format showing the relationship between the steering direction of the steering wheel and the turning direction of the vehicle.

FIG. 15 shows a case where the steering wheel is steered in the counterclockwise direction while the vehicle is moving in reverse. FIG. 16 is the control status of the rotation vector of each of the left and right rear wheels when the vehicle is in a turning mode (rotation) state. When the steering wheel is steered in the counterclockwise direction, the rotational speed vectors of the left and right rear wheels face each other at an identical size. Here, the size of the rotational speed vector of the rear wheels is altered with the manipulated variable of the accelerator.

Next, the CPU reads the tilt status of the auxiliary wheel floatation designation unit, and further judges whether the vehicle is in a state of allowing the auxiliary wheels to float. A state where the auxiliary wheels may be floated is a state when the vehicle is traveling in straight advancement, the vehicle speed is above a prescribed value, and the tilt of the auxiliary wheel floatation designation unit is in an automatic position. The CPU is able to detect whether the auxiliary wheel is in a floating state upon receiving a detection signal from the inclination sensor provided to the vehicle.

When the vehicle accelerates in the straight advancement direction, the auxiliary wheels of the vehicle float in accordance with such acceleration. Next, when the vehicle proceeds to the constant speed traveling state, the CPU reads an optimum floatation from a prescribed table in the storage memory in accordance with the speed detection value, drives the foregoing centroid position alteration device in accordance with this floatation, and moves the center of gravity of the vehicle toward the rear of the vehicle in a prescribed amount. When the vehicle speed is of a relatively slow speed, the center of gravity of the vehicle is moved toward the rear of the vehicle, and, when the vehicle is traveling at a relatively fast speed, the center of gravity of the vehicle is changed to be toward the front of the vehicle.

The floatation of the vehicle may be suitably adjusted within a minute range by the passenger operating the tilt device. When increasing the floatation of the auxiliary wheels, the center of gravity of the vehicle is moved toward the rear, and, contrarily, when decreasing the floatation of the auxiliary wheels, the center of gravity of the vehicle is moved toward the front of the vehicle. The passenger may select a desired operational characteristic by adjusting the floatation.

Next, the CPU judges whether to maintain the floated auxiliary wheels, and, when the steering wheel is operated exceeding a prescribed angle, the center of gravity of the vehicle is moved toward the advancing direction side when the vehicle is decelerated, and the auxiliary wheels are made to contact the ground. That is, when the vehicle is steered, the auxiliary wheels are made to contact the ground in order to stabilize the behavior of the vehicle when the vehicle is to be decelerated.

As described above, the present invention does not require a structure enabling the steering of the front wheels, and a drive characteristic difference can be provided to the respective driving means merely by the passenger changing a steering device such as a steering wheel or lever to a desired direction, and, as a result, provided is a direction control device capable of changing the direction of a control target such as a vehicle in a desired direction. The present intention further quickly and accurately realizes the drive control of the respective drive shafts in order to enable the direction control of the control target. Moreover, the present invention is capable of providing a direction control device employable in a steering wheel as the steering device. In an electric vehicle with the front wheels as the auxiliary wheels, the present invention is capable of providing direction control technology in which added to the foregoing direction device is a control mechanism enabling the travel of an electric vehicle with such auxiliary wheels afloat while such electric vehicle is running. The present invention is further capable of providing an electric vehicle comprising the foregoing direction control device.

What is claimed is:

1. A direction control device capable of controlling a direction of a control target including a plurality of driving means by individually controlling said driving means, comprising:
   a drive control means for controlling a drive of respective drive means;
   a target direction commanding means for commanding a target direction for a movement of said control target; and
   a drive characteristic difference setting means for setting a drive characteristic difference in work speed between the respective driving means such that the direction of said control target is controlled in said target direction:
   wherein said drive control means controls the drive of each of said driving means in accordance with said drive characteristic difference in work speed and comprises a control circuit adapted to control feedback to each of said driving means such that a drive characteristic difference detection result will become a set value as said drive characteristic and wherein said control circuit comprises a PLL control circuit which controls each of said driving means based on a phase difference of a reference signal frequency and a drive state detection signal frequency of said driving means and wherein said control circuit sets said phase difference initially based on said drive characteristic set.

2. A direction control device for a vehicle including an electric motor for individually rotationally driving each of a plurality of drive wheels between stationary, current direction and target direction drive modes, and which is capable of controlling a vehicle direction by providing a rotation difference between each of the respective drive wheels based on a steering state of a steering means, comprising:
   a drive control means capable of controlling the a drive of each of said electric motors;
   a target direction commanding means for commanding a target direction of said vehicle based on a steering state of said steering means;
   an electric motor characteristic difference setting means for setting a rotational status of the respective electric motors, the rotational status indicative of a rotation difference in each of the drive wheels; and
   a detection means for detecting an actual rotational status of each of the electric motors;
   wherein said drive control means controls the drive of each electric motor of each drive wheel as a function of a set rotational status and the detected rotational status of each of said electric motors, and controls an advancing direction of the vehicle toward the target direction by providing a rotational difference to each of said drive wheels based upon the steering state.

3. A direction control device according to claim 2, wherein said drive control means comprises a PLL control circuit which controls the electric motor of each of said drive wheels based on a phase difference of a detected frequency signal and a reference frequency signal wherein the reference frequency signal is derived from a set rotational status for each electric motor of each drive wheel and a detected frequency signal is derived from the detected rotational status for each electric motor of each drive wheel.

4. A direction control device according to claim 3, wherein the PLL circuit is provided with a division value which is altered with each change in drive state of said vehicle, the drive state indicated by a difference between a reference frequency signal determined from a target drive state and the detected frequency signal detecting an actual drive state of the rotational driving means.

5. A direction control device according to claim 2, wherein said steering means is a steering wheel, and said target direction commanding means sets the target direction of said vehicle in accordance with the steering state of said steering wheel.

6. A direction control device according to claim 2, wherein said vehicle comprises auxiliary front wheels which rotate in the direction of said vehicle without any steerage or drive and which support the vehicle against a road surface; and said drive control means further comprises a floatation control means for floating said auxiliary wheels while said vehicle is moving forward and maintaining the floating state of said auxiliary wheels while the vehicle is moving.

7. A vehicle comprising the direction control device according to claim 1.

8. An electric vehicle comprising a direction control device having an electric motor for individually rotationally driving each of a plurality of drive wheels, and which is capable of controlling a vehicle direction by providing a rotational difference to the respective drive wheels based on a steering state of a steering means, comprising:
   a drive control means capable of controlling the driving of each electric motor;
   a target direction commanding means for commanding a target direction of said vehicle based on the steering state of said steering means;
   a drive characteristics setting means for setting a drive state for each electric motor for each drive wheel thereby providing the rotational difference in each of said drive wheels such that a movement of said vehicle is controlled in said target direction; and
   a detection means for detecting a rotational status of the respective motors;
   wherein said drive control means controls driving each electric motor of each of said drive wheels as a function of a rotational status set value for each electric motor and a detected rotational status value for each electric motor, where the rotational status set value corresponds to a designated rotational speed pulse signal from a pulse motor.

9. An electric vehicle according to claim 8, wherein said drive control means comprises a PLL control circuit which controls the electric motor of a drive wheel based on a phase difference between a reference frequency signal and a detected frequency signal, wherein the reference frequency signal is derived from the rotational status set value and the detected frequency signal is derived from the detected rotational status of each of said electric motors.

10. A steering control device of a vehicle having a plurality of wheels supporting a vehicle body against a road surface for movement between a current traveling direction and steerage direction, comprising:

a drive control means for individually controlling a drive for each wheel of a pair of wheels positioned on a left and right side of said vehicle body and the pair of wheels being selected from said plurality of wheels;

a steering angle setting means for setting a designated steering angle signal of a frequency corresponding to a steerage direction of said vehicle;

a drive signal output control means for outputting a drive signal of a prescribed frequency to each drive control means for performing independent drive control for each drive of said pair of wheels based on the designated steering angle signal of the steering angle setting means;

a steering angle detection means for detecting a current steering angle direction utilizing the current traveling direction of said vehicle as a reference;

a signal converting means for converting a detected steering angle signal to a frequency signal corresponding to the steering angle detected with said steering angle detection means; and a phase comparison means for comparing phases of the frequency signal corresponding to the designated steering angle with said steering angle setting means and the detected steering angle frequency signal obtained with said signal converting means;

wherein a drive signal is output to the drive of each of the respective wheels from said drive control means to cause the vehicle to move toward the steerage direction such that said phases will coincide based on a comparison result of said phase comparison means.

11. A steering control device according to claim 10, wherein said phase comparison means and drive control means each comprise a PLL circuit.

12. A steering control device according to claim 10, wherein the drive for said pair of wheels is an electric motor.

13. A direction control device according to claim 3, wherein said vehicle comprises auxiliary front wheels which rotate in the direction of said vehicle without any steerage or drive and which support the vehicle against a road surface; and said drive control means further comprises a floatation control means for floating said auxiliary wheels while said vehicle is moving forward and maintaining a floating state of said auxiliary wheels while the vehicle is moving.

14. A direction control device according to claim 4, wherein said vehicle comprises auxiliary front wheels which rotate in the direction of said vehicle without any steerage or drive and which support the vehicle against a road surface; and said drive control means further comprises a floatation control means for floating said auxiliary wheels while said vehicle is moving forward and maintaining a floating state of said auxiliary wheels while the vehicle is moving.

15. A direction control device according to claim 5, wherein said vehicle comprises auxiliary front wheels which rotate in the direction of said vehicle without any steerage or drive and which support the vehicle against a road surface; and said drive control means further comprises a floatation control means for floating said auxiliary wheels while said vehicle is moving forward and maintaining a floating state of said auxiliary wheels while the vehicle is moving.

* * * * *